3,370,101
COCATALYST SYSTEM FOR ORGANIC REACTIONS
Charles H. Hayes and Steven W. Swenson, Anaheim, and Thomas F. Rodé, Fullerton, Calif., assignors to Atlantic Richfield Company, a corporation of Pennsylvania
No Drawing. Filed Nov. 19, 1963, Ser. No. 324,828
19 Claims. (Cl. 260—671)

The present invention relates to catalysis of organic reactions and a novel cocatalyst composition. More particularly, our present invention relates to a method for effecting catalytic organic reactions utilizing as a catalyst a Lewis acid with an acidic cationic exchange resin promotor or cocatalyst.

Protonic acids, i.e., acids which liberate the strongly acidic hydrogen ion, have been used to effect various organic reactions, such as, hydrocarbon conversion reactions. For example, they have been used in the alkylation of aromatic and paraffinic compounds with olefins, the isomerization of paraffins and alkylaromatic compounds, and the polymerization of normal and branched chain olefins, aromatic olefins, and functionally substituted olefins. Many of the organic reactions catalyzed by protonic acids such as sulfuric and hydrofluoric acid can also be catalyzed by a Lewis acid, e.g., metal halides, promoted with a protonic Lewis base which may be any substance which can donate an electron pair or pairs. The prior art commercial use of strongly acid catalysts with highly unsaturated hydrocarbons tends to result in the formation of insoluble hydrocarbon-catalyst complexes or sludges and, accordingly, it is desirable to limit the time during which the active catalyst contacts the hydrocarbon reactants. Since the catalyst system is a homogenous mixture of the acid and the promoter in the prior art cocatalyst systems, the activity of the Lewis acids is difficult to control precisely and, consequently, is accompanied by the formation of hydrocarbon complexes and other undesirable side reactions. When homogenous cocatalysts are used, the catalysis proceeds until the catalyst and cocatalyst are separated. Separation and circulation of the liquid catalyst in the prior art homogenous processes to control the formation of complexes increases the processing costs. The reusability and regenerability of most acid catalysts is limited in that the acid becomes diluted with use. In addition, some acid catalysts, e.g., hydrofluoric acid, must be separated from water and sludge by distillation. In the prior art Lewis acid processes the catalyst, e.g., aluminum chloride, may be partially lost through complex formation.

The concurrent use of a Lewis acid and an acidic cationic exchange resin has been described in the prior art for alkylation. In this prior art, however, the only Lewis acid mentioned was boron trifluoride which forms an inactive complex with the ion exchange resin, consequently requiring an excess of free boron trifluoride over that required to saturate the acidic cationic exchange resin in order to provide an active catalyst. Hence, this prior art process results in the loss of boron trifluoride and requires a free (excess) boron trifluoride to olefin weight ratio of 0.2 to 1.5. Hence, a 1:1 mole ratio of $BF_3$ to $H^+$ (on the ion exchange resin) is inactive.

Our present invention overcomes the above mentioned deficiencies which are inherent in the prior art processes by providing a catalyst which does not form an inactive complex with the promoter and also providing an easily separable cocatalyst system in which the catalyst is readily separable from the promoter and the reaction products.

It is, therefore, an object of the present invention to provide a novel cocatalyst system for catalyzing organic reactions.

It is also an object of the present invention to provide a method for catalyzing alkylation, isomerization and polymerization reactions with a readily separable cocatalyst system which does not form an insoluble complex.

It is also an object of the present invention to provide a process of the type catalyzed by protonic acids with a cocatalyst system which affords means for controlling the reaction and limiting the side reactions.

Other objects and a more complete understanding of our present invention may be had by reference to the following specification taken in conjunction with the appended claims.

Briefly stated, our present invention involves a method for catalyzing organic reactions of the type catalyzed by protonic acids, such as, hydrocarbon conversions, by utilizing a cocatalyst system comprising an acidic cationic exchange resin and a Lewis acid of the type which does not form an inactive complex with the resin. The cocatalysts of our present invention need not be preformed, that is, the catalysts and the promoter do not have to be mixed or reacted prior to catalysis of the reaction. As will be seen from the following description, the reactants are mixed with the Lewis acid and passed through a reactor containing the cationic exchange resin in bead form whereby the reaction may be controlled more precisely with respect to temperature and time of reaction.

The ion exchange resins useful in promoting or cocatalyzing the reactions of the present invention are of the type synthesized by vinyl polymerization or condensation reactions and are well known in the prior art. The polymeric portion of the resin is so highly cross-linked that the solubility of the resin structure is negligible. The acidic portion of the resin is provided by reacting a phenolic, sulfonic, carboxylic, or phosphonic acid group onto the polymer backbone. The ion exchange resin should be hydrophilic (swells in the presence of water or other highly polar solvent), carbophilic (swells in polar or nonpolar solvents), or macroreticular (permanently open structure). Macroreticular, acidic, cationic exchange resins possess permanently open pores into which the reactants may diffuse with ease and react and, hence, no polar solvent is necessary. A gel type acidic cationic exchange resin, however, should be used with a polar solvent capable of swelling the resin to such an extent that the pores are opened and the reactants can enter therein.

By polar solvents it is meant substances the molecules of which possess significant dipole moments and are capable of swelling hydrophilic cationic exchange resins by solvation of the polar groups on the resin. These solvents should not react irreversibly with the Lewis acid portion of the catalyst. Examples of such polar solvents are ethylene chloride, tetrachloroethane, nitromethane, nitrobenzene, dimethylsulfoxide, and sulfur dioxide. Cationic exchange resins of the type useful in the present invention are disclosed in copending patent application Serial No. 126,828 filed July 17, 1961, and now abandoned in favor of continuation-in-part application Serial No. 573,208, filed August 18, 1966.

A Lewis acid, in conformity with conventional nomenclature, is a compound in which the normal electronic grouping about the central nucleus or atom is incomplete, and, thus, the central atom can accept an electron pair or pairs from a Lewis base, which is any compound capable of donating an electron pair or pairs. Lewis acids include, for example, the fluorides, chlorides, and bromides of Cu, Be, Zn, Cd, Hg, Al, Ga, In, Tl, Sn, Ti, Zr, Hf, P, As, Sb, Bi, V, Nb, Ta, Te, Mo, W, Fe, Th and U, as well as molecular $I_2$.

In the present invention the Lewis acid can react with the anion of the acidic cationic exchange resin (a Lewis base) liberating the strong acid H+ (hydrogen ion). It is hypothesized that this is the manner in which the catalyst functions. Thus, an equilibrium is set up in which the concentration of active catalyst, H+, varies with the reaction type. For example, in the Amberlyst-15-TiCl₄ system where R is Amerblyst-15 minus one —SO₃H group, the active catalyst may be shown as:

$$RSO_3H + TiCl_4 \rightleftharpoons RSO_3TiCl_4^-, H^+$$

The present method may be performed in its preferred embodiment by passing a stream containing the reactants, a polar solvent (if necessary) and the soluble Lewis acid catalyst through a bed of the acidic cationic exchange resin in bead form whereby catalysis occurs in the bed of the resin cocatalyst so that the temperature and contact time of the reactants with the catalyst system may be accurately controlled. Care should be exercised to prevent impurities capable of acting as cocatalysts from entering the catalyst-reactant mixture prior to contacting the mixture with the ion exchange resin. The process should also be controlled to avoid the formation of cocatalysts in the reactor bed so that no appreciable reaction will occur in the product separation or recycle systems. The reaction of the present invention is preferably conducted by feeding dry feed materials to thereby limit hydrolysis of the Lewis acid and the accompanying release of corrosive hydrolysis products into the system.

The reactions catalyzed by the present invention should be conducted at temperatures below aproximately 175° C. to prevent heat damage to the ion exchange resin catalyst. Preferably, from the standpoint of the exchange resin life, the temperature of the process is held in the 120–150° C. range.

An active catalyst system useful in the present invention is obtained at a 1:25 mole ratio of Lewis acid to ionizable hydrogen on the cationic exchange resin (H+). The upper range is believed to be approximately 50:1 Lewis acid to H+, with the optimum catalyst activity occurring in the range of 0.5:1 to 5:1. The catalyst system of the present invention is active without first forming a complex with the resin by saturating the resin with the Lewis acid. Such initial complexing would be objectionable in that it would result in a reduced catalyst activity thus requiring an excess of Lewis acid.

The catalyst system of the present invention has been found to be effective in catalyzing hydrocarbon conversions, such as alkylation, isomerization and polymerization reactions. The process may be employed for the alkylation of aromatic compounds and paraffins and cycloparaffins having hydrogen on a tertiary carbon atom, such as isobutane, isopentane, benzene, toluene, xylene, cymene, phenol, alkyl phenols, methylcyclopentane, ethylcyclopentane, methylcyclohexane and ethylcyclohexane by olefins, cycloolefins and cycloparaffins such as ethylene, propylene, mono-, di-, tri-, tetra-, and pentapropylene, 1- and 2-butylene, isobutylene, amylene, hexene, heptene, 1-octene, 1-nonene, 1-decene, 1-dodecene and 1-tridecene. The alkylation of aromatics and olefins such as ethylene, propylene, butylene, 2-methyl-2-butene, pentene, hexene and styrene by alkyl halides, alcohols and ethers is also within the scope of our present invention. The isomerization of paraffins, cycloparaffins, olefins, cycloolefins and alkylaromatic compounds such as 1-dodecene, n-butane, n-pentane, hexane, 2- and 3-methylpentane, methylcyclopentane, methylcyclohexane, 2-butene, n-pentenes, 1-hexene, 2-methyl-1-butene and 2,3-dimethyl-1-butene may be performed with the cocatalyst system of our present invention. The olefins undergo skeletal as well as double bond isomerization and the alkylaromatic compounds undergo rearrangement, disproportionation, and skeletal isomerization of the alkyl group.

Normal and branch chain olefins, cycloolefins, aromatic olefins and halogen and functionally substituted olefins may be polymerized with the catalyst system of the present invention. Monomers yielding high molecular weight polymer are generally styrene, substituted styrene, vinyl ethers and isobutylene. Lower molecular weight polymers may be produced from ethylene, propylene, butylene, isoamylene, etc.

*Example 1*

146 g. of dried benzene (1.88 moles), 10 g. of Amberlyst-15 (Resin A), an acidic macroreticular ion exchange resin in bead form (0.049 equivalent H+), and 9.65 g. of titanium tetrachloride (0.050 mole) were stirred in an indented batch reactor at a speed sufficient to suspend the ion exchange resin beads uniformly. 42 g. of 1-dodecene (0.25 mole) was added at room temperature to the reactor and stirring continued for six hours. The TiCl₄/H+ mole ratio was 1:1; the catalyst to dodecene mole ratio was 1:5; the benzene to dodecene ratio was 7.5:1. The two hours reaction time analysis by GLPC showed 95% conversion of 1-dodecene and an 83 mole percent yield of phenyldodecane based on 1-dodecene (theoretical yield). At the end of the six hours reaction time the mixture was cooled to 10° C. and 100 ml. of water added and stirred with the mixture for ten minutes to decompose the titanium tetrachloride. The product layer was separated, washed with water and dried. The product analysis was the same as it was after the second hour. The product was a mixture of phenyldodecane isomers and the analyses were calculated from areas on a vapor fractogram. The reaction was carried out at atmospheric pressure under dry nitrogen. The ion exchange resin was vacuum dried at 90–105° C.

The above reaction was repeated in the absence of titanium tetrachloride, in the absence of the ion exchange resin and with HCl as a cocatalyst in the place of the ion exchange resin.

The above reaction was repeated with toluene in the place of benzene at a temperature of 117° C. for six hours resulting in a conversion of 98% and a yield of 33 mole percent. The above reaction was repeated using a different acidic macrorecticular ion exchange resin, Amberlyst XN-1005 (Resin B) with and without TiCl₄. The results of these reactions are shown in Table I below.

TABLE I.—ALKYLATION OF BENZENE AND TOLUENE WITH 1-DODECENE

| Catalyst | Aromatic | Temp., °C. | Time, hrs. | Olefin conversion, percent | Yield, mole percent |
| --- | --- | --- | --- | --- | --- |
| 1. Resin (A) | Benzene | 85 | 6 | 32 | 34 |
| 2. Resin (B) |  | 25 | 2 | 10 | 0.3 |
| 3. TiCl₄ |  | 85 | 6 | Trace | 0.3 |
| 4. TiCl₄-HCl |  | 86 | 5 | 26 | 1.5 |
| 5. Resin (A)-TiCl₄ |  | 86 | 5.5 | 99 | 87 |
| 6. Resin (A)-TiCl₄ |  | 25 | 2 | 95 | 83 |
| 7. Resin (B)-TiCl₄ |  | 25 | 2 | 99 | 82 |
| 8. Resin (A)-TiCl₄ | Toluene | 117 | 6 | 98.5 | 33 |

Example 2

Three moles of isobutene and one mole of ethylene were charged to a glass rocking bomb with Amberlyst-15 ion exchange resin (Resin A) with a $C_2H_4/H^+$ (moles/equivalent of $H^+$ on resin) ratio equal to 11.2–12.1:1 and ethylene to boron trifluoride (mole/mole) equal to 3.34:1, and the reaction run for over twenty hours at room temperature. The $BF_3/H^+$ ratio was varied from 1:1 to 4.1:1 and the results tabulated in Table II.

TABLE II.—ALKYLATION OF ISOBUTANE WITH ETHYLENE

| Catalyst | $BF_3/H^+$ | Reaction pressure, p.s.i.g. | | Conversion, percent | Yield, mole percent |
| --- | --- | --- | --- | --- | --- |
| | | Initial | Final | | |
| Resin (A)-$BF_3$ | 4.1/1 | 400 | 260 | 100 | 25 |
| Resin (A)-$BF_3$ | 1/1 | 210 | 190 | 32 | 1 |
| Resin (B)-$BF_3$ | 3/1 | 350 | 280 | 72 | 24 |
| $BF_3$ | | 370 | 345 | 17 | 5 |
| Resin (B)-$BF_3$ | 3/1 | 328 | 78 | 98 | 22 |

Example 3

114 g. of 1-dodecene (0.68 mole) was added at 86° C. for six hours with 10 g. of Amberlyst-15 (0.049 equivalent $H^+$) and 9.46 g. $TiCl_4$ (0.050 mole) in a dry batch reactor at atmospheric pressure under dry nitrogen. The mixture was stirred at a speed sufficient to suspend the resin beads uniformly in the indented batch reactor. After six hours reaction time the mixture was stirred with the 100 ml. of water for ten minutes to decompose the $TiCl_4$ and the product separated, washed with water and dried. Infrared analysis showed an internal/external ratio of 5:1 for the double bond.

Example 4

99.3 g. of 2-methyl-2-butene (1.41 moles) was stirred at a speed sufficient to suspend the resin beads uniformly with 10 g. of Amberlyst-15 (0.49 equivalent of $H^+$) and 9.46 g. $TiCl_4$ (0.50 mole) at room temperature for four hours in an indented batch reactor. At the end of the four hour reaction time the mixture was stirred with 50 ml. of water for a time sufficient to hydrolize the $TiCl_4$. The product was separated, washed with aqueous NaOH and dried. Analysis by GLPC showed a 47% conversion of 2-methyl-2-butene and a 30 mole percent yield of dimer based on 2-methyl-2-butene (theortical yield). Mass spectral analysis of the crude product showed 67.9 mole percent $C_{10}$ olefin (corrected for $C_6$ and lighter).

Example 5

The reactions of Example 4 were repeated in a cyclohexane solvent at 30° C. for four hours with a conversion of 90% and a dimer yield of 69.7 mole percent.

Example 6

The experiment of Example 4 was repeated using as a cocatalyst Amberlyst-15 and $SnCl_4$ at 25° C. for four hours. A conversion of 20% with a dimer yield of 16 mole percent was obtained.

The test results shown in the above examples demonstrate the effectiveness of the acidic ion exchange resin-Lewis acid cocatalyst system of the present invention. The data shown in Table I as compared with that shown in Table II demonstrates the difference between the cocatalyst of the present invention and that of the prior art with respect to alkylation. Example 3 shows our catalyst system as used to catalyze isomerization, and Examples 4, 5 and 6 show the utility of our catalyst for polymerization reactions.

Although our present invention has been described with a certain degree of particularity, it is to be understood that the scope of our invention is not to be limited by the details set forth, but should be afforded the full breadth of the appended claims.

We claim:

1. A method for hydrocarbon conversion in a nonaqueous media which comprises contacting with a dehydrated form of a resin selected from the group consisting of hydrophilic, carbophilic, and macroreticular acidic cationic exchange resins, a mixture of hydrocarbon reactants and a Lewis acid catalyst of the type which does not form an inactive complex with said resin.

2. The method of claim 1 wherein the mole ratio of said Lewis acid catalyst to the hydrogen ion content of said resin is 1:1 or less.

3. The method of claim 1 wherein said resin is macroreticular.

4. The method of claim 1 wherein the Lewis acid is soluble in the hydrocarbon reactants.

5. A method for hydrocarbon conversion in a nonaqueous media which comprises contacting with a dehydrated acid form of a hydrophilic sulfonic acid cationic exchange resin, a mixture of hydrocarbon reactants and a Lewis acid catalyst of the type which does not form an inactive complex with said resin, in a nonaqueous polar solvent.

6. A method for hydrocarbon conversion in a nonaqueous media which comprises contacting with a dehydrated form of a macroreticular sulfonic acid cationic exchange resin, a mixture of hydrocarbon reactants and titanium tetrachloride.

7. A method for hydrocarbon conversion in a nonaqueous media which comprises contacting with a dehydrated form of a macroreticular sulfonic acid cationic exchange resin, a mixture of hydrocarbon reactants and stannic chloride.

8. The method of claim 6 wherein the mole ratio of said Lewis acid to the hydrogen ion content of said resin is from about 0.5:1 to 5:1.

9. A process for the alkylation of hydrocarbons possessing hydrogen on a tertiary carbon atom selected from the group consisting of aromatics, paraffins and cycloparaffins by an olefinic hydrocarbon which comprises contacting the dehydrated acid form of a resin selected from the group consisting of hydrophilic, carbophilic and macroreticular sulfonic acid cationic exchange resins, with a mixture of said hydrocarbons, said olefinic hydrocarbons, and a Lewis acid of the type which does not form an inactive complex with said resin.

10. The process of claim 9 wherein said Lewis acid is titanium tetrachloride.

11. The process of claim 9 wherein said ion exchange resin is hydrophilic and said mixture is dissolved in a nonaqueous polar solvent.

12. The process of claim 9 wherein said ion exchange resin is macroreticular.

13. The process of claim 9 wherein the mole ratio of said Lewis acid to the hydrogen ion content of said resin is 1:1 or less.

14. A catalyst for hydrocarbon conversion comprising a dehydrated acid form of a resin selected from the group consisting of hydrophilic, carbophilic and macroreticular cationic exchange resins and a Lewis acid of the type which does not form an inactive complex with said resin and which is soluble in said hydrocarbon reactants.

15. The catalyst of claim 14 wherein said Lewis acid is titanium tetrachloride.

16. The catalyst of claim 14 wherein the mole ratio of said Lewis acid catalyst to the hydrogen ion content of said resin is 1:1 or less.

17. A catalyst for hydrocarbon conversion comprising a macroreticular cationic exchange resin and a Lewis acid of the type which does not form an inactive complex with said resin and which is soluble in said hydrocarbon reactants.

18. A process for the isomerization of a hydrocarbon compound selected from a group consisting of paraffins, cycloparaffins, olefins, cycloolefins, and alkylaromatics, which comprises contacting the dehydrated acid form of a resin selected from the group consisting of hydrophilic, carbophilic, and macroreticular sulfonic acid cationic exchange resins, with a mixture of said hydrocarbon in a Lewis acid of the type which does not form an inactive complex with said resin.

19. A process for the polymerization of hydrocarbons selected from the group consisting of normal and branch chain olefins, cycloolefins, aromatic olefins, and halogen and functionally substituted olefins, which comprises contacting the dehydrated acid form of a resin selected from the group consisting of hydrophilic, carbophilic and macroreticular sulfonic acid cationic exchange resins, with a mixture of said hydrocarbons and a Lewis acid of the type which does not form an inactive complex with said resins.

References Cited

UNITED STATES PATENTS

| | | | |
|---|---|---|---|
| 3,151,179 | 9/1964 | Kennedy et al. | 260—683.2 |
| 3,238,266 | 3/1966 | Skripek | 260—671 |
| 3,250,813 | 5/1966 | Stephenson | 252—428 X |

FOREIGN PATENTS 733,753   7/1955   Great Britain.

DELBERT E. GANTZ, *Primary Examiner.*

C. R. DAVIS, *Assistant Examiner.*